(12) United States Patent
Nguyen et al.

(10) Patent No.: US 6,751,753 B2
(45) Date of Patent: Jun. 15, 2004

(54) METHOD, SYSTEM, AND PROGRAM FOR MONITORING SYSTEM COMPONENTS

(75) Inventors: Tin L. Nguyen, San Jose, CA (US); Dina H. Selim, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 625 days.

(21) Appl. No.: 09/794,412

(22) Filed: Feb. 27, 2001

(65) Prior Publication Data

US 2002/0120886 A1 Aug. 29, 2002

(51) Int. Cl.$^7$ ................................................. G06F 11/30
(52) U.S. Cl. ................................................. 714/39; 714/38
(58) Field of Search ....................... 714/39, 38; 717/116

(56) References Cited

U.S. PATENT DOCUMENTS

| | | | | |
|---|---|---|---|---|
| 6,131,185 A | * | 10/2000 | Coskun et al. | 717/129 |
| 6,405,327 B1 | * | 6/2002 | Sipple et al. | 714/39 |
| 6,434,715 B1 | * | 8/2002 | Andersen | 714/39 |
| 6,457,152 B1 | * | 9/2002 | Paley et al. | 714/738 |
| 6,594,786 B1 | * | 7/2003 | Connelly et al. | 714/50 |
| 6,601,193 B1 | * | 7/2003 | Liebau | 714/39 |
| 6,604,210 B1 | * | 8/2003 | Alexander et al. | 714/39 |
| 6,633,838 B1 | * | 10/2003 | Arimilli et al. | 703/16 |
| 6,662,313 B1 | * | 12/2003 | Swanson et al. | 714/39 |
| 6,675,359 B2 | * | 1/2004 | Gilford et al. | 716/1 |

OTHER PUBLICATIONS

Sun Microsystems, Inc. "Sun StorEdge Component Manager 2.0 User's Guide" Jan. 2000, Revision A, Part No. 806–1579–10, pp. iii–110.

* cited by examiner

Primary Examiner—Scott Baderman
Assistant Examiner—Anne L. Damiano
(74) Attorney, Agent, or Firm—Kanrad, Raynes & Victor LLP (57) ABSTRACT

Provided is a method, system, program, and data structure for deriving state information concerning a monitored system component. A status object is provided including information on a current state of the monitored system component. There are a plurality of states associated with the monitored system component, wherein each state is capable of having a state action and at least one transition condition associated with a transition state. A measured system parameter is received and a determination is made as to whether the received measured system parameter satisfies one transition condition associated with the current state indicated in the status object. If the received system parameter satisfies one transition condition, then the state action associated with the transition state associated with the satisfied transition condition is performed. The current state is set to the transition state in the status object.

57 Claims, 6 Drawing Sheets

METHOD, SYSTEM, AND PROGRAM FOR MONITORING SYSTEM COMPONENTS

BACKGROUND OF THE INVENTION

1. Field of the Invention

The present invention relates to a method, system, and program for monitoring system components.

2. Description of the Related Art

Prior art devices provide a monitoring program to monitor the operation of a system. For instance, the Sun Microsystems, Inc. ("SUN") StorEdge Enclosure Manager provides management and monitoring of a SUN A5x00 storage subsystem.** The StorEdge Enclosure Manager provides alarm notification and remote reporting (via email, files, and system logging) upon detection of abnormal activities or conditions within a designated storage enclosure. An alarm provides a notification that signifies that a problem may need to be resolved depending on a detected severity. The StorEdge Enclosure Manager monitors system status information in intervals as part of a "polling" operation. In monitoring specific hardware components, a set of "rules" are provided that define the conditions under which a notification or alarm is issued. The alarm or notification may indicate that the status is "ok", critical in that one or more critical conditions have been detected, unrecoverable in that one or more unrecoverable conditions have occurred, or unknown.

In the StorEdge Enclosure Manager, a file monitoring class lexically analyzes strings of messages written to an administrative file to which system status information is written. If there is a match between state information in the administrative file and a rule, then the Enclosure Manager may write data to a log file and/or generate an alarm. Some of the system components and resources that may be monitored include the disks, a Gigabit Interface Converter (GBIC) module that converts electrical signals to optical signals, the power supply, system temperature, fan status, loop status of the connection between host and storage system, backplane status, etc. With the prior art Enclosure Manager, the user may specify an e-mail or pager address for remote reporting of alarms, the time interval for polling of resources, etc. The SUN Component Manager provides similar monitoring services for a storage subsystem, and is described in the SUN publication "Sun StorEdge Component Manager 2.0 User's Guide" (Copyright SUN, January 2000).

The rule system of prior art system monitoring tools, such as those discussed, above, have rules that specify a particular action when a threshold value is reached. Such systems may generate excessive notifications if system resource values are experiencing thrashing, i.e., constantly changing and thereby constantly triggering alarms as the state change passes the threshold value. For instance, the temperature of one or more system components may be monitored and an alarm generated when different threshold temperature values reached. With such systems, alarm notifications may be continually generated if the temperature continues to fluctuate to different threshold values that trigger the alarm.

For the above reasons, it would be desirable to provide a monitoring system that can provide a greater degree of flexibility in monitoring system states to avoid situations where alarms may be excessively generated as measured system parameters continuously fluctuate.

SUMMARY OF THE PREFERRED EMBODIMENTS

Provided is a method, system, program, and data structure for deriving state information concerning a monitored system component A status object is provided including information on a current state of the monitored system component. There are a plurality of states associated with the monitored system component, wherein each state is capable of having a state action and at least one transition condition associated with a transition state. A measured system parameter is received and a determination is made as to whether the received measured system parameter satisfies one transition condition associated with the current state indicated in the status object. If the received system parameter satisfies one transition condition, then the state action associated with the transition state associated with the satisfied transition condition is performed. The current state is set to the transition state in the status object.

In further implementations, if the transition state associated with the satisfied transition condition is the current state, then a counter is incremented.

Still further, if the transition state is the current state, then a determination is made as to whether a frequency event associated with the transition condition is satisfied. The state action associated with the current state is performed if the associated frequency event was satisfied.

Further provided is a method, system, program, and data structure for implementing a state machine to monitor a system component. A state class and status object class are provided. A status object is instantiated from the status object class, wherein the status object includes a current state variable indicating a current sate of the state machine. Multiple states of the state machine are instantiated from the state machine class, wherein each state is capable of having a state action and notification performed when transitioning to the state from another state. At least one evaluation function is generated for each state, wherein each evaluation function determines whether an operation on a measured system component satisfies a condition. A transition state is associated with each evaluation function. The status object is updated to indicate the transition state as the current state if the associated evaluation function determines that the condition is satisfied.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
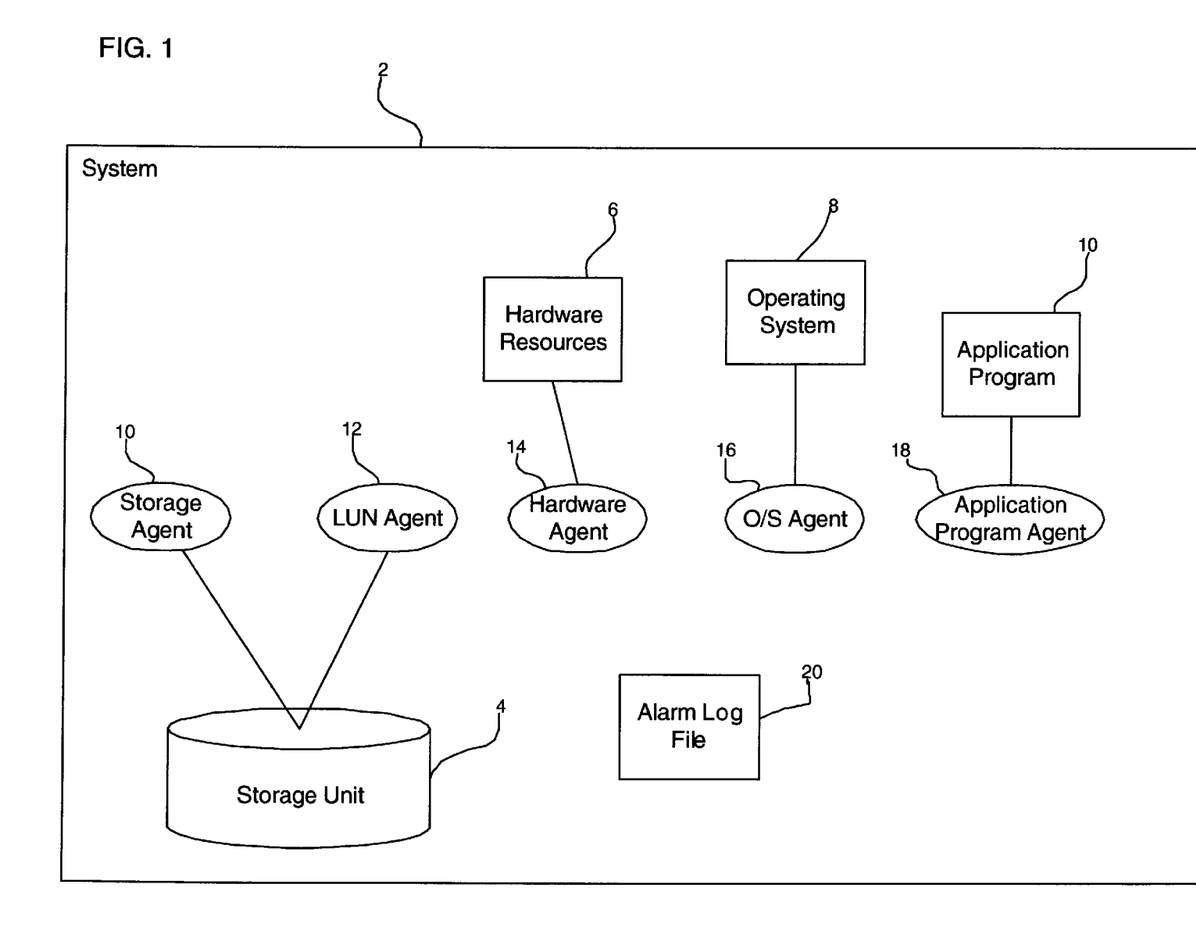
FIG. 1 is an illustration of an implementation of a computing environment in which certain of the described implementations are embodied.

FIG. 1 illustrates a computing environment implementation of the invention. A system 2 includes numerous monitorable hardware and software resources, such as a storage unit 4 comprised of one or more disks, hardware resource 6, which may comprise any system 2 hardware resource such as a monitorable sensor, power unit, interface card, processor, etc., an operating system 8, and an application program 10. The system 2 further includes agents 10, 12, 14, 16, and 18.

With respect to the storage unit 4, the storage agent 10 may monitor the presence of the following conditions, the removal of a disk drive, disabling of a disk drive, failure of an area of a disk drive, bringing a newly installed disk drive on-line, a disk error, etc. The storage units 4 may be configured into logical storage regions assigned a logical unit number (LUN). A LUN agent 12 may monitor the following parameters for each LUN configured in the storage unit 4: a current number of write and read requests received from all hosts, total blocks transferred to a LUN, blocks written and received, soft errors comprising the number of errors in which a disk retry succeeds, hard errors indicating the number of times input or output failed for a LUN, cache write and read hits and misses, etc.

The system 2 may include additional hardware agents 14 to monitor additional system hardware resources 6, such as interface cards, power supply, controller, system sensors, etc. For instance, an interface card agent could monitor whether an interface card is available, installed, missing, disabled, has an error, etc. A power module agent can monitor the following power module parameters: whether a power supply is missing, the temperature, fan fault, when the power supply is disabled, off, a battery is missing, etc. A controller agent can monitor the status of a controller, such as whether a controller is missing, disabled, role changed (e.g., slave, master, etc.), controller error, when a connection is lost, etc. Additionally, the system 2 may include sensors to measure various system environmental conditions, such as the temperature, DC current levels, etc. In such case, there may be separate hardware agents to monitor the values at the sensors. In networked environments, the hardware resources may include the network to which the system is connected. Any other specific system 2 hardware, storage, and network resources can also be monitored with an agent.

The system 2 may also include agents to monitor the status of software programs installed on the system. An operating system agent 16 would monitor the status of operating system 8 resources, such as the number of threads open, processes invoked, threads or processes that have crashed, available memory, etc. The system 2 may include one or more application program agents 18 that monitor the status of various application programs 10 executing on the system 2. For instance, a database agent may monitor the status of a database program by reading various database log files looking for any logged errors or performing various tests, such as running Structured Query Language (SQL) tests to determine whether the database engine is performing SQL queries properly, etc.

The hardware or software agents may query the monitored program or hardware resource directly to obtain system status information. Additionally, the agents may read an alarm log file 20 to which the hardware or software resource logs status information and system parameters. The alarm log file 20 may be a general file or a log file used exclusively by one of the hardware or software agents, or shared by multiple of the agents.

In certain implementations, each agent 10, 12, 14, 16, and 18 is implemented as a state machine. The state machine is comprised of a plurality of states and transition conditions that define movement between the states. Each state is associated with a transition action that is performed whenever control moves to the state according to the state machine rules. The transition condition comprises a function that considers as parameters the current state and a measured monitored parameter. A transition state is associated with the transition condition such that satisfaction of the transition condition makes the current state the transition state. The state machine would include nodes/states for different possible states of the monitored system component.

Figure 2:
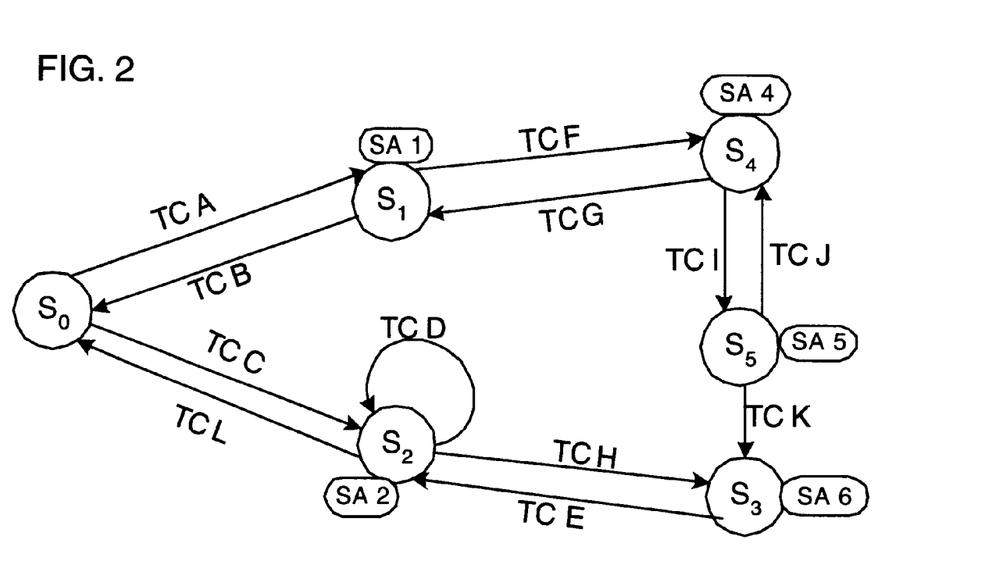
FIG. 2 illustrates an example of a state machine in accordance with certain implementations of the invention.

FIG. 2 illustrates an example of a state machine in accordance with certain implementations, where there are a plurality of states $S_i$. Each state $S_i$ is associated with at least one transition condition ($TC_j$) that evaluates the current state and a measured parameter and returns a boolean response. For instance, the transition condition may evaluate whether the measured parameter exceeds a threshold. If the evaluation is true, then the current state becomes the state associated with the transition condition ($TC_j$). Upon retuning "true" to a transition condition ($TC_j$) and moving to the transition state, a state action ($SA_k$) associated with the transition state performed. The state action ($SA_k$) may specify an alarm or notification, and message providing information on the recent state or activity in the machine.

In the state machine of FIG. 2, the initial state is $S_0$. Upon the satisfaction of transition condition A ($TC_A$), control proceeds to state $S_1$ where state action 1 ($SA_1$) is performed. The state action may specify to generate an alarm to notify the user of a condition in the system, do nothing, write data to a log file or perform any other system operation. State $S_2$ is a counter state. While at counter state $S_2$, if the counter transition condition D ($TC_D$) is met, then the transition condition reenters the current state $S_2$, i.e, the current state and transition state are the same, and the state action 2 ($SA_2$) is performed. In one implementation, the state action ($SA_2$) associated with the counter state may specify a time interval, such that after a period of time has elapsed a notification event is performed that provides information to the user or system about the counter value and measured counter event. Additionally, the counter state action ($SA_2$) may specify an action to perform after the counter has reached a predetermined value. Further, a counter state may have transition conditions pointing to other states. For instance, the transition conditions $TC_L$ and $TC_H$ for the counter state $S_2$ specify movement to states $S_0$ and $S_3$, respectively, upon the transition condition being satisfied, e.g., the temperature falls or other measured parameter falls within a predetermined range.

Figure 3:
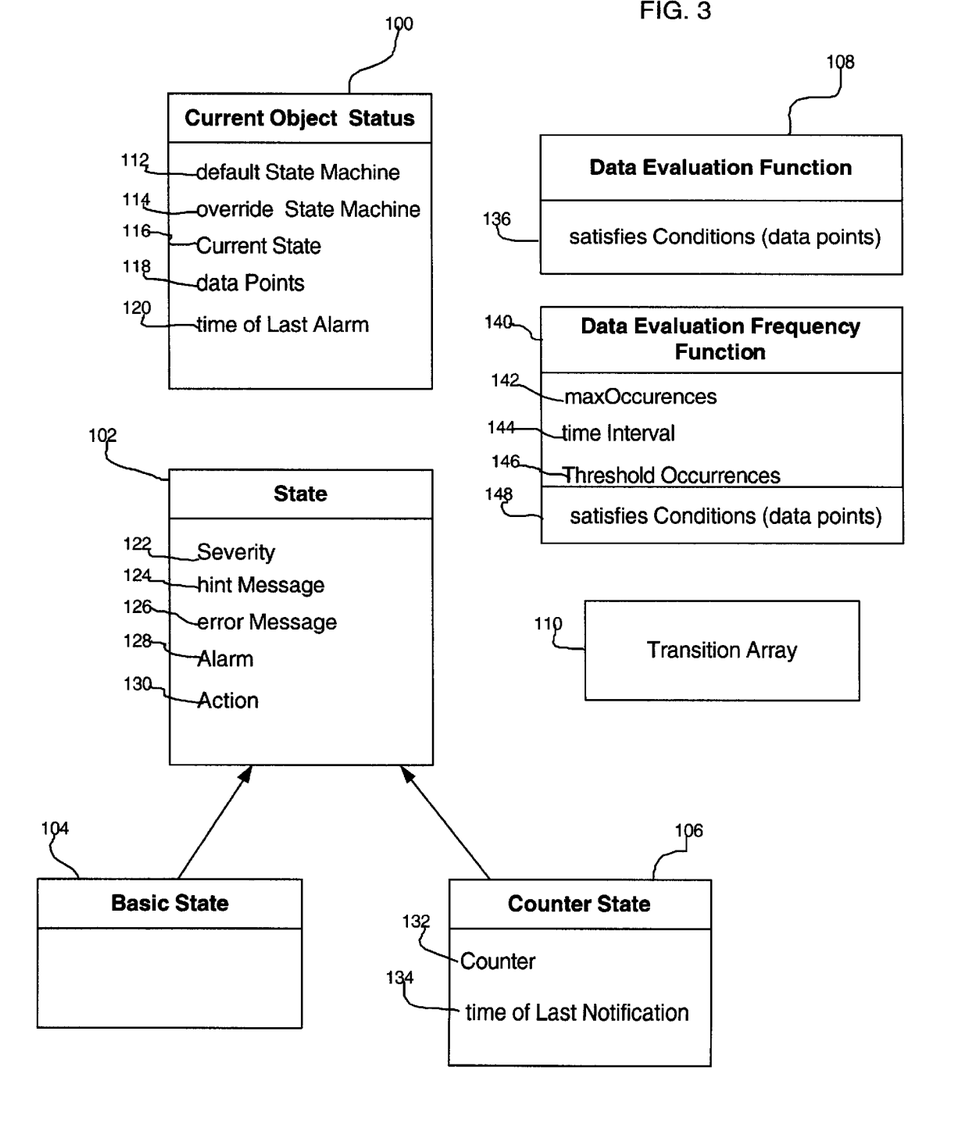
FIG. 3 illustrates object oriented classes for implementing a state machine to monitor system components in accordance with certain implementations of the invention.

FIG. 3 illustrates an object oriented implementation of the components of a state machine for each system agent 10, 12, 14, 16, and 18. The object oriented implementation includes a current status object class 100 which is used to instantiate a current status object that maintains information on the current state of the state machine, i.e., the current state of a system agent 10, 12, 14, 16, and 18. Each state of the state machine that implements one agent 10, 12, 14, 16, and 18 is an instance of the state class 102. The state class 102 is a base class of the basic state class 104 and counter state class 106 which provides an extended class including additional attributes to implement a counter state. A data evaluation function 108 comprises a function that implements a transition condition to evaluate a measured system parameter and, in some instances, information in the status object. The output of the data evaluation function 108 is a boolean value depending on whether the condition is satisfied. Each state would have at least one data evaluation function 108 to allow transitioning to other states.

A transition array 110 defines the interconnection of the states. The transition array 110 would comprise an m×m array, where m is the number of states instantiated from the basic state class 104 or the counter state class 106. The row value of the transition array 110 represents the current state value and the column value indicates the transition state. Each cell in the transition array 110 includes either 0 or a data evaluation function providing a transition condition. If the cell (i, j) in row i, column j in the transition array has a zero or null value, then there is no transition from current state i to state j. If the cell (i, j) has an instance of a data evaluation function 108 or pointer thereto, then that data evaluation function 108 is a transition condition, such that satisfaction of the condition specified in cell (i, j) causes the state machine to move from current state i to transition state j. Each cell may have a different data evaluation function, as each state is the culmination of a unique set of events or measured parameters causing transitions to such state.

Each agent 10, 12, 14, 16, and 18 includes a status object, instantiated from the status object class 100, that provides information on the current state of the system component monitored by the agent. The status object may have the following attributes:

default state machine 112: points to a default state machine used by the agent implemented in the status object to determine the transition state. The state machine would comprise all the states instantiated from the state classes 104 and 106 and the transition array 110 defining the interconnections between the states. The initial state machine instantiated from the state machine classes 104 or 106 would comprise the default state machine.

override state machine 114: points to a user modified instance of the default state machine, if one is created, that is used in lieu of the default state machine to determine the transition state and any action to take. The override state machine may comprise modifications, additions and/or deletions to the states of the default state machine identified in the default state machine 112 attribute. In certain implementations, if a value is provided for the override state machine 114, then the override state machine is used; otherwise, the default state machine is used.

Current State 116: identifies the current state of the system component monitored for the agent 10, 12, 14, 16, and 18. This current state is based on the culmination of all previous states resulting from the measured parameters evaluated according to the data evaluation functions.

data points 118: comprises the recent measured parameter, e.g., temperature, hardware or process status, etc. and a timestamp of when the measurement was taken. The current status object may not maintain any data points of historical data, and just may maintain the current state.

time of last alarm 120: the status object may maintain a system time the last alarm notification was generated.

The base state class 102 is used to instantiate each state in a state machine implementation for a particular agent 10, 12, 14, 16, 18. The base state class 102 may include the following attributes:

severity 122: because the states in the described implementations relate to a measured system parameter, the severity 122 indicates the degree of concern that should be associated with a measured component parameter falling outside of normal operational ranges. A high severity indicates that the evaluation function detects a measured event that is likely to have a greater impact on system performance and vitality than satisfaction of an evaluation function associated with a low severity state.

hint message 124: the hint message comprises a message to present to the user or a log file 20 indicating a cause or source of the problem and a suggested corrective action for the user or system administrator to take in response to the measured parameter. This information would be useful for diagnostic purposes and may be based on the experience of an expert diagnostician when experiencing a certain measured parameter associated with the state. This attribute is optional.

error message 126: provides a message explaining the error. This attribute is optional.

alarm 128: identifies whether an alarm associated with the state is set. If so, then a notification would be generated to an administrator or write to the alarm log file 20, and provide any hint message 124 and/or error message 126 information.

action 130: indicates that an action associated with the state is set to occur. If so, then a specified action would be performed. The action may describe the alarm operation to perform if the alarm 128 value is set to true, e.g., send an e-mail, page, etc. Additionally, the action 130 may comprise execution of a program or system command to perform a particular corrective action, such as diagnose a program, close a program or alter the operation of a hardware or software component, etc.

As mentioned, a state may be instantiated from the basic state class 104. States instantiated from the basic state class 104 may include one or more of the attributes included in the state class 102. States instantiated from the counter state class 106, may include any of the attributes from the base state class 102 plus attributes from the extended counter state class 108, which include:

counter 132: provides a counter that is incremented whenever a transition condition is satisfies that reenters a counter state.

time of last notification 134: provides a last time the user was notified when in the counter state. This is used to determine whether to set the alarm 128 and action 130 associated with the state to take action and notify the user. In certain implementations, a notification may be sent within a specified time interval from the time of last notification. This time interval is set in the time interval parameter in the data evaluation frequency parameters discussed below.

The data evaluation functions 108 provide a function, shown as the satisfies conditions function 136 that is called after receiving a measured system parameter to determine whether a transition condition associated with the current state is satisfied. The function provided with the data evaluation functions 108 can perform any type of operation on measured system parameters, information in the status object, and a current system time. A data evaluation frequency function 140 provides additional parameters for use with counter state, including:

max occurrences 142: a maximum counter value that when reached triggers the alarm 128 and action 130 events associated with the state.

time interval 144: if when reentering the counter state, the time since the last notification, as indicated in the time of the last notification parameter 134, is at least the time interval 144, then the alarm 128 and action 130 parameters are set to take the specified action and provide notification.

satisfies condition 148: is the evaluation operation returning a boolean response based on the measured parameter.

Figure 4:
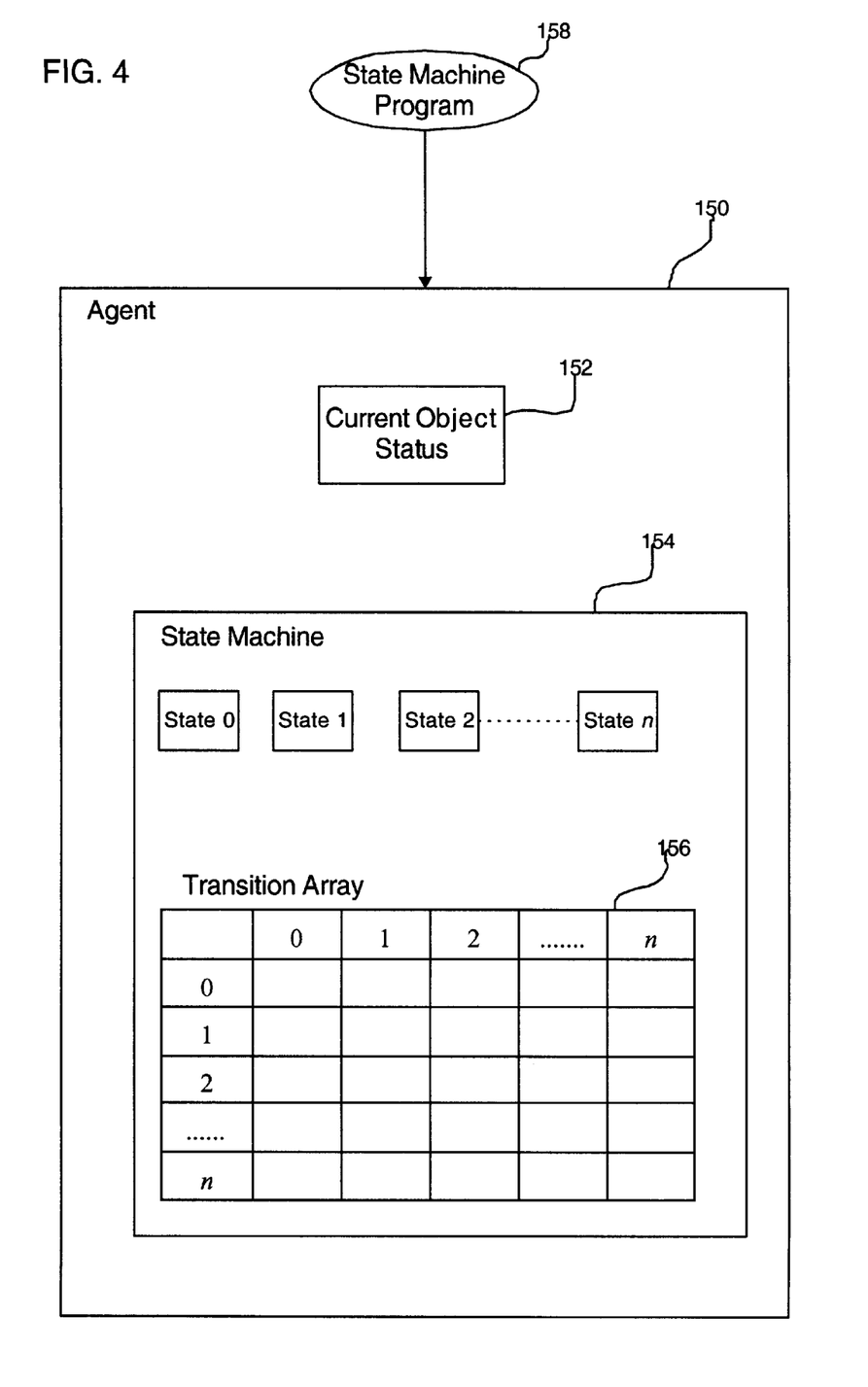
FIG. 4 illustrates an agent instantiated from the classes described in FIG. 3 to monitor one system component in accordance with certain implementations of the invention.

FIG. 4 represents an implementation of a state machine for an agent 150, which may monitor the parameters monitored by agents 10, 12, 14, 16, 18, that includes components instantiated from the classes 100, 104 or 106. Agent 150 includes a current object status 152, including one or more of the attributes 112–120 in the current object status class 100, and a state machine 154 including states 0 through n instantiated from the basic state 104 and counter state 106 classes, and including one or more of the state attributes 122–130, and counter state attributes 132–134 if instantiated from the counter state class 106. The state machine 154 further includes an n×n transition array 156, where each cell (i, j) in the array can have no transition condition, indicating no transition from state i to state j, or a data evaluation function (not shown). Each cell (i, j) may include a different evaluation operation. If the data evaluation function condition is satisfied, then the state machine transitions from state i to state j. A state machine program 158 is capable of processing the state machine 152 objects to determine a next state from the current state 116 in the current object status 152 based on the transition array 156.

Figure 5:
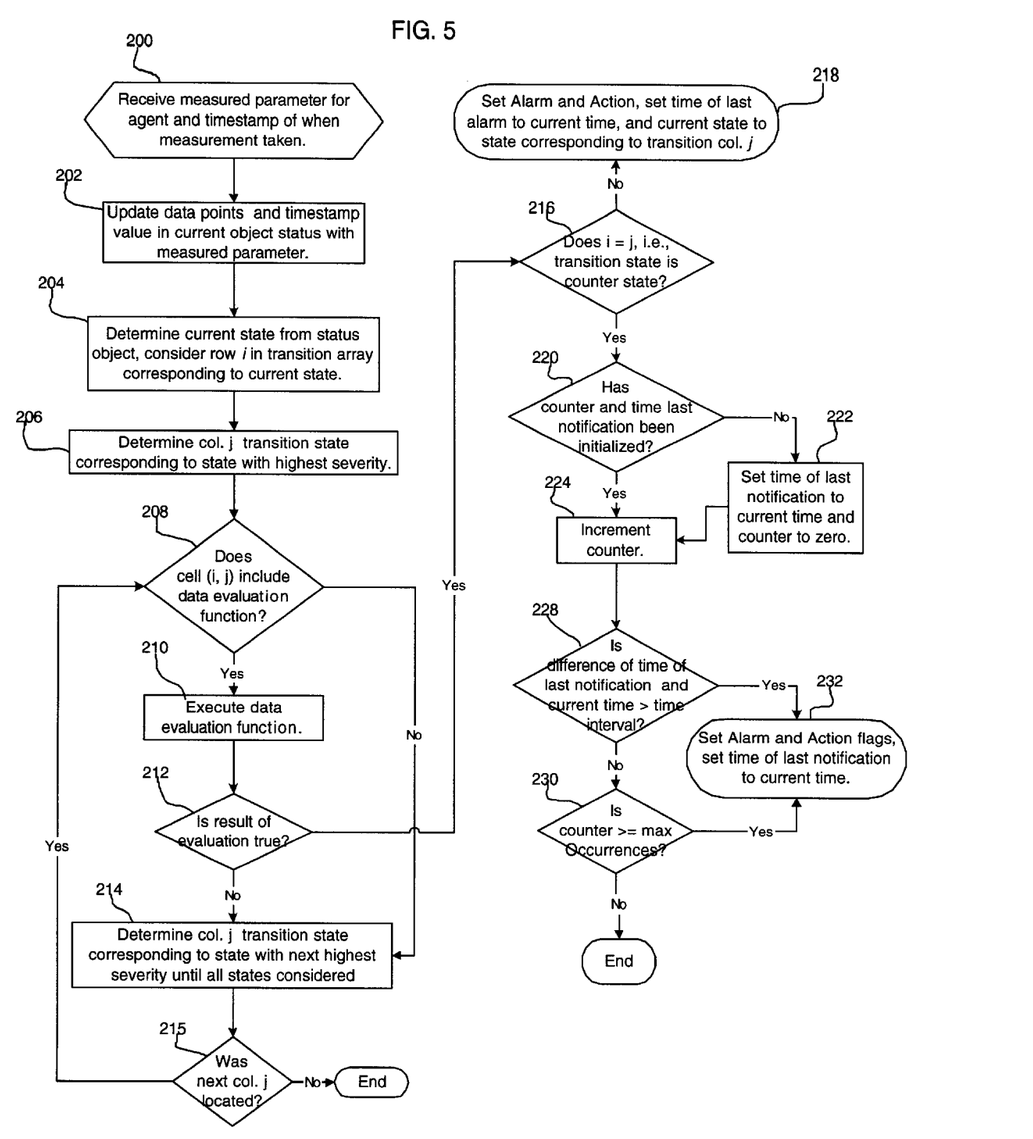
FIG. 5 provides a flowchart to monitor a system component using the objects instantiated from the classes described in FIG. 3 in accordance with certain implementations of the invention.

FIG. 5 illustrates logic implemented in the state machine program 158 to implement the state machine for agent 150. Control begins at block 200 with the state machine program 158 receiving a measured system parameter for an instantiated agent and a timestamp of the measured parameter. The state machine program 158 updates (at block 202) the data points in the current object status 152 for the agent 150 with the measured parameter and the timestamp. The state machine program 158 would select the appropriate state machine 150 from the default state machine 112 and override state machine 114 parameters. An override state machine 114 is used first. If one override state machine 114 is not available, then the default state machine is used.

A determination is made (at block 204) of the row i in the transition array 156 corresponding to the current state parameter 116 in the current status object status 152. The state machine program 158 then determines (at block 206) column j in the transition array corresponding to the state 0 . . . n having the highest severity, as indicated in the severity 122 parameter of the state 0 . . . n. If (at block 208) the cell i, j in the transition array 156 includes a data evaluation function, as opposed to an empty value, e.g., zero, then the state machine program 158 calls (at block 210) the data evaluation function in cell i, j. If (at block 212) the result of the evaluation is not true or if (at block 208) cell i, j does not include a data evaluation function, then the state machine program 158 determines (at block 214) the column j transition state corresponding to the state with the next highest severity of those states not yet considered. If (at block 215) a next, yet unconsidered transition state, was determined (at block 214), then control transfers back to block 208 to consider the cell i, j; otherwise, control ends at a point where no data evaluation function in the cells of row i returned a satisfied result. At such point, the state machine would remain at the current state until another measurement causes a state change.

If (at block 212) the result of the data evaluation was true and if (at block 216) the current state is not a counter state, i.e., i is not equal to j, then the state machine program 158 sets (at block 218) the alarm 128 and action 130 parameters "on" to cause the generation of an alarm notification and invoke the action associated with the transition state. Execution of the alarm and notification actions could generate the hint message 124 and error message 126 provided with the instance of the transition state. Further, at block 218 the current state 116 is then set to the transition state corresponding to column j, and the time of the last alarm 120 to the current time. A counter state counts the number of times the state has been reentered. In one implementation, a counter state is coded in the transition array 110 by including the data evaluation function for the counter state in cell i, j, where i equals j, so that satisfaction of the data evaluation function causes the reentry of the current state.

If (at block 216) the transition state reenters the current state, i.e, is a counter state, then a determination is made if the counter 132 and time of last notification 134 has been initialized, i.e., is the first counter event. If not, then (at block 222) the time of last notification parameter 134 is set to the current time and the counter is set to zero. If (from the yes branch of block 220 or block 222) the counters have been initialized, then the counter 132 is incremented (at block 224). At block 230 a determination (at block 228) is made if the time interval 144 has passed since the time of last notification 134. If so, then the alarm 128 and action 130 parameters are set (at block 232) "on", and the time of last notification parameter 134 is updated to the current time. If (at block 230) the counter is greater than or equal to the maximum occurrences parameter 142, then control proceeds to block 232 to provide notification of the alarm and action. Thus, the alarm and action are set if either a user specified time interval 144 has elapsed since the time of last notification 134 or the counter reaches a maximum. If neither of the time interval 144 or maximum occurrences 146 thresholds are satisfied, then control ends with the counter 132 incremented, but none of the other actions and alarms associated with the counter state performed.

With the above object oriented implementations, the classes 100, 102, 108, 140 instantiate the components of a state machine, including a current status object 152, states 0 . . . n and generate a transition array 110. For instance, the classes 100, 102, 108, 140 may be used to instantiate the state machine for an instance of an agent, e.g., a storage agent, a LUN agent, a hardware agent, an operating system (O/S) agent, application program agent, etc. Such a system is extensible because a user can use the state classes 104 and 106 to add new states to a state machine, and modify the state machine. For instance, a state machine, including a current object status, states, and transition array of data evaluation functions may be instantiated to monitor different LUN related parameters, such as a current number of write and read requests received from all hosts, total blocks transferred to a LUN, blocks written and received, soft errors comprising the number of errors in which a disk retry succeeds, hard errors indicating the number of times input or output failed for a LUN, cache write and read hits and misses, etc. Further, a user can instantiate additional agents to monitor any type of system component. Moreover, a user can define an override state machine 114 for critical applications and data, and use a different state machine for less critical agents.

Still further, the administrator can define counter states that "count" the number of occurrences of an event, i.e., a measured parameter at a certain value, to return information after a certain amount of time or upon the counter reaching a threshold value. The administrator may further specify any evaluation operation based on the measured parameter and any other data points, such as the current state, current time, etc. The alarm or notification may utilize any possible technique for alerting an administrator of an event, such as a pager, e-mail, automated voice mail, writing to a log file etc., and the action performed may comprise any action related to the event, such as performing any diagnostic operations or adjusting system operations in response to the event.

Figure 6:
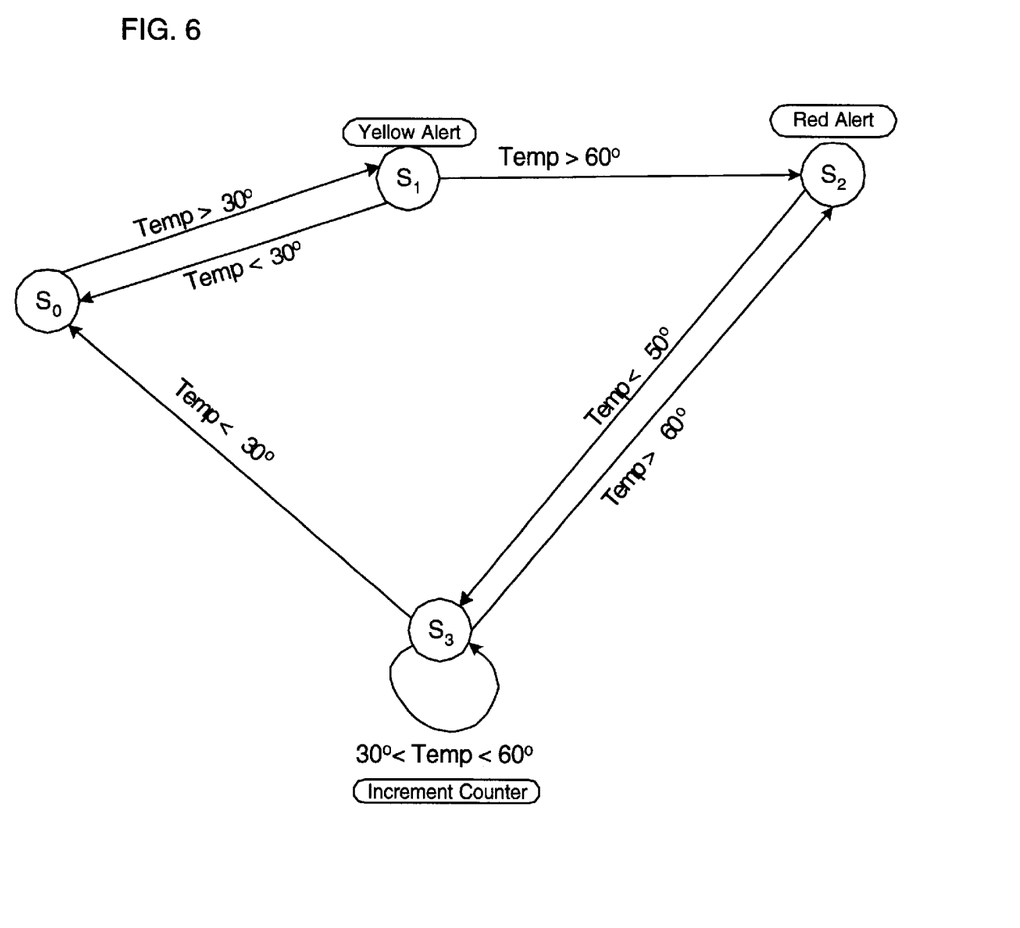
FIG. 6 illustrates another example of a state machine in accordance with certain implementations of the invention.

FIG. 6 illustrates an example of a state machine used to provide notification to an administrator in the event of temperature changes of a monitored system component. From the initial state $S_0$, when the temperature initially is above 30° Celsius, control proceeds to state $S_1$ where a yellow alarm notification is generated. The notification may display an alert on an administrator's computer monitor or generate an e-mail or pager notification. If a subsequent temperature measurement is above 60°, then the state changes to state $S_2$ where a "red alert" notification is issued indicating a dangerously high temperature for the monitored system component. If at state $S_2$ a measured temperature falls below 50°, then control proceeds to intermediate state $S_3$ where a counter is incremented. Subsequent temperature measurements between 30° and 60° while at state $S_3$ increments the counter without any notification to the user. State $S_3$ is an intermediate state that prevents the state machine from issuing continuous notifications if the temperature is constantly fluctuating in a range. Instead, at state $S_3$, a notification may be issued providing information on the counter, i.e., the number of times the temperature was between 30° and 60°, after a time interval from the last notification or if the counter reaches a maximum value. In this way, the state machine of FIG. 6 provides intelligence in determining whether to take an action based on a monitored system value because the intermediate state $S_3$ prevents constant notifications if the temperature is continually fluctuating to avoid overloading the system administrator with unnecessary notifications.

In additional implementations, a system administrator can access and modify the instantiated state objects 0 . . . n for a state machine 154, the messages 124, 126, or the transition array 110 to alter the transition conditions implemented in the data evaluation functions. Moreover, if the administrator alters the states 0 . . . n or transition array 156 in the state machine 154, then the administrator may save such state machine 154 as an override state machine. The current object status 152 for certain agents may be updated to have the override state machine 114 parameter point to the new state machine 154 to use in lieu of the default, premodification version of the state machine. The current object status for other agents may continue to use the default state machine. A graphical user function (GUI) may be provided to allow the user to specify state machine modifications in a convenient format, and then code the rule function with the user specified changes.

In further implementations, the override state machine 116 may provide a state machine for the current object status of mission critical applications that provide greater reactivity to detected measurement changes. Other agents instantiated for non-mission critical applications may use the default state machine.

Following are some further implementations.

The above described state machines of FIGS. 2 and 6 are examples of state machines that provide intermediate states and counters to provide more intelligence in responding to detected machine states. Those skilled in the art will appreciate that numerous different additional states may be added to the state machine examples in FIGS. 3 and 6, including numerous additional loops and intermediate states to provide for further intelligence and control over responses to state changes in the system.

In certain described implementations, the measured parameters provided to the evaluation function comprised a temperature measurement. Additionally, the measured parameter may comprise any current system state or statistic maintained in the system, such as input/output (I/O), disk access, processor performance and usage, and memory usage related statistics.

The transition array 110 was described as implemented as a table

The program flow logic described in the flowcharts indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for deriving state information concerning a monitored system component, comprising:

providing a status object including information on a current state of the monitored system component, wherein there is a plurality of states associated with the monitored system component, wherein each state is capable of having a state action and at least one transition condition associated with a transition state;

receiving a measured system parameter;

determining whether the received measured system parameter satisfies one transition condition associated with the current state indicated in the status object;

if the received system parameter satisfies one transition condition, then performing the action associated with the transition state associated with the satisfied transition condition and setting the current state to the transition state in the status object; and incrementing a counter if the transition state associated with the satisfied transition condition is the current state.

2. The method of claim 1, wherein the action associated with one state is capable of specifying a notification operation or system operation.

3. The method of further performing if the transition state is the current state:

determining satisfaction of a frequency event associated with the transition condition; and performing the state action associated with the current state if the associated frequency event was satisfied.

4. The method of claim 3, wherein determining satisfaction of the frequency event comprises determining whether a time since a last notification exceeds a time interval threshold.

5. The method of claim 3, wherein determining satisfaction of the frequency event comprises determining whether the counter exceeds a threshold value.

6. The method of claim 1, wherein each transition condition comprises a function on the measured system parameter determining whether a threshold is satisfied.

7. The method of claim 1, wherein the monitored system component can comprise one hardware or software resource in the system.

8. A method for deriving state information concerning a monitored system component, comprising:
providing a status object including information on a current state of the monitored system component, wherein there is a plurality of states associated with the monitored system component, wherein each state is capable of having a state action and at least one transition condition associated with a transition state;
receiving a measured system parameter;
determining whether the received measured system parameter satisfies one transition condition associated with the current state indicated in the status object; and
if the received system parameter satisfies one transition condition, then performing the action associated with the transition state associated with the satisfied transition condition setting the current state to the transition state in the status object,
wherein a state machine comprises a plurality of states, state actions, and transition conditions and wherein the status object further indicates a state machine to apply to the received measured system parameter.

9. The method of claim 8, wherein the state machine indicated in the status object comprises a default state machine, further comprising:
receiving user modifications to at least one of the states, state actions or transition conditions of the state machine indicated in the status object;
generating a modified state machine implementing the user modifications; and
updating the status object to indicate the modified state machine to apply to the received measured system parameter.

10. A method for deriving state information concerning a monitored system component, comprising:
providing a status object including information on a current state of the monitored system component, wherein there is a plurality of states associated with the monitored system component, wherein each state is capable of having a state action and at least one transition condition associated with a transition state;
receiving a measured system parameter;
determining whether the received measured system parameter satisfies one transition condition associated with the current state indicated in the status object; and
if the received system parameter satisfies one transition condition, then performing the action associated with the transition state associated with the satisfied transition condition setting the current state to the transition state in the status object,
wherein each state is instantiated from at least one state class and wherein each status object is instantiated from a status object class.

11. A method for implementing a state machine to monitor a system component, comprising:
providing a state class and status object class;
instantiating a status object from the status object class, wherein the status object includes a current state variable indicating a current state of the state machine;
instantiating multiple states of the state machine from the state class, wherein each state is capable of having a state action and notification performed when transitioning to the state from another state;
generating at least one evaluation function for each state, wherein each evaluation function determines whether an operation on a measured system component satisfies a condition; and
associating a transition state with each evaluation function;
updating the status object to indicate the transition state as the current state if the associated evaluation function determines that the condition is satisfied.

12. The method of claim 11, wherein instantiating the current status object further comprises setting a state machine variable indicating one state machine including instantiated states, generated evaluation functions, and associated transition states, wherein the indicated state machine is used to determine the transition state based on the measured system parameter.

13. The method of claim 12, further comprising:
setting an override state machine in the instantiated status object identifying a second state machine to use to determine the transition state based on the measured system parameter.

14. The method of claim 11, wherein when instantiating the state, indicating at least one of a notification operation or system operation.

15. The method of claim 11, wherein the state is capable of being a counter state having one counter evaluation function where the associated transition state is the state, wherein the counter state further includes a counter that is incremented when the counter evaluation function is satisfied.

16. The method of claim 15, wherein generating the counter evaluation function further comprises generating an associated frequency event, wherein the state action associated with the counter state is performed if the associated frequency event was satisfied.

17. The method of claim 16, wherein the frequency event indicates a time interval threshold, wherein determining satisfaction of the frequency event comprises determining whether a time since a last notification exceeds the time interval threshold.

18. The method of claim 16, wherein the frequency event indicates a threshold value, wherein determining satisfaction of the frequency event comprises determining whether the counter exceeds the threshold value.

19. A system for deriving state information concerning a monitored system component, comprising:
a computer readable memory including:
(i) a status object including information on a current state of the monitored system component;
(ii) information indicating a plurality of states associated with the monitored system component, wherein each state is capable of having a state action and at least one transition condition associated with a transition state;
means for receiving a measured system parameter;
means for determining whether the received measured system parameter satisfies one transition condition associated with the current state indicated in the status object;
means for performing, if the received system parameter satisfies one transition condition, the action associated with the transition state associated with the satisfied transition condition;

means for setting, if the received measured system parameter satisfies one transition condition associated with the current state indicated in the status object, the current state to the transition state in the status object; and means for incrementing a counter if the transition state associated with the satisfied transition condition is the current state.

20. The system of claim 19, further comprising:

means for determining, if the transition state is the current state, satisfaction of a frequency event associated with the transition condition; and means for performing the state action associated with the current state if the associated frequency event was satisfied.

21. The system of claim 20, wherein the means for determining satisfaction of the frequency event comprises determining whether a time since a last notification exceeds a time interval threshold.

22. The system of claim 19, wherein each transition condition comprises a function on the measured system parameter determining whether a threshold is satisfied.

23. A system for deriving state information concerning a monitored system component, comprising:

a computer readable memory including:
   (i) a status object including information on a current state of the monitored system component;
   (ii) information indicating a plurality of states associated with the monitored system component, wherein each state is capable of having a state action and at least one transition condition associated with a transition state;

means for receiving a measured system parameter;

means for determining whether the received measured system parameter satisfies one transition condition associated with the current state indicated in the status object;

means for performing, if the received system parameter satisfies one transition condition, the action associated with the transition state associated with the satisfied transition condition; and means for setting, if the received measured system parameter satisfies one transition condition associated with the current state indicated in the status object, the current state to the transition state in the status object, wherein a state machine comprises a plurality of states, state actions, and transition conditions, wherein the status object further indicates a state machine to apply to the received measured system parameter.

24. The system of claim 23, wherein the state machine indicated in the status object comprises a default state machine, further comprising:

means for receiving user modifications to at least one of the states, state actions or transition conditions of the state machine indicated in the status object;

means for generating a modified state machine implementing the user modifications; and means for updating the status object to indicate the modified state machine to apply to the received measured system parameter.

25. A system for deriving state information concerning a monitored system component, comprising:

a computer readable memory including:
   (i) a status object including information on a current state of the monitored system component;
   (ii) information indicating a plurality of states associated with the monitored system component, wherein each state is capable of having a state action and at least one transition condition associated with a transition state;

means for receiving a measured system parameter;

means for determining whether the received measured system parameter satisfies one transition condition associated with the current state indicated in the status object;

means for performing, if the received system parameter satisfies one transition condition, the action associated with the transition state associated with the satisfied transition condition;

means for setting, if the received measured system parameter satisfies one transition condition associated with the current state indicated in the states object, the current state to the transition state in the status object; and means for instantiating each state from at least one state class, wherein each status object is instantiated from a status object class.

26. A system for implementing a state machine to monitor a system component, comprising:

a computer readable memory including a state class and status object class;

means for instantiating a status object from the status object class, wherein the status object includes a current state variable indicating a current state of the state machine;

means for instantiating multiple states of the state from the state machine class, wherein each state is capable of having a state action and notification performed when transitioning to the state from another state;

means for generating at least one evaluation function for each state, wherein each evaluation function determines whether an operation on a measured system component satisfies a condition;

means for associating a transition state with each evaluation function; and means for updating the status object to indicate the transition state as the current state if the associated evaluation function determines that the condition is satisfied.

27. The system of claim 26, wherein the means for instantiating the current status object further performs setting a state machine variable indicating one state machine including instantiated states, generated evaluation functions, and associated transition states, wherein the indicated state machine is used to determine the transition state based on the measured system parameter.

28. The system of claim 26, wherein the state is capable of being a counter state having one counter evaluation function where the associated transition state is the state, wherein the counter state further includes a counter that is incremented when the counter evaluation function is satisfied.

29. The system of claim 28, wherein the means for generating the counter evaluation function generates an associated frequency event, wherein the state action associated with the counter state is performed if the associated frequency event was satisfied.

30. The system of claim 29, wherein the frequency event indicates a time interval threshold, wherein the means for determining satisfaction of the frequency event determines whether a time since a last notification exceeds the time interval threshold.

31. An article of manufacture implementing code to derive state information concerning a monitored system component by:

providing a status object including information on a current state of the monitored system component, wherein there is a plurality of states associated with the monitored system component, wherein each state is capable of having a state action and at least one transition condition associated with a transition state;

receiving a measured system parameter;

determining whether the received measured system parameter satisfies one transition condition associated with the current state indicated in the status object;

if the received system parameter satisfies one transition condition, then performing the action associated with the transition state associated with the satisfied transition condition and setting the current state to the transition state in the status object; and incrementing a counter if the transition state associated with the satisfied transition condition is the current state.

32. The article of manufacture of claim 31, wherein the action associated with one state is capable of specifying a notification operation or system operation.

33. The article of manufacture of claim 31, further performing if the transition state is the current state;

determining satisfaction of a frequency event associated with the transition condition; and performing the state action associated with the current state if the associated frequency event was satisfied.

34. The article of manufacture of claim 33, wherein determining satisfaction of the frequency event comprises determining whether a time since a last notification exceeds a time interval threshold.

35. The article of manufacture of claim 33, wherein determining satisfaction of the frequency event comprises determining whether the counter exceeds a threshold value.

36. The article of manufacture of claim 31, wherein each transition condition comprises a function on the measured system parameter determining whether a threshold is satisfied.

37. The article of manufacture, of claim 31, wherein the monitored system component can comprise one hardware or software resource in the system.

38. An article of manufacture implementing code to derive state information concerning a monitored system component by:

providing a status object including information on a current state of the monitored system component, wherein there is a plurality of states associated with the monitored system component, wherein each state is capable of having a state action and at least one transition condition associated with a transition state;

receiving a measured system parameter;

determining whether the received measured system parameter satisfies one transition condition associated with the current state indicated in the status object; and if the received system parameter satisfies one transition condition, then performing the action associated with the transition state associated with the satisfied transition condition and setting the current state to the transition state in the status object, wherein a state machine comprises a plurality of states, state actions, and transition conditions, wherein the status object further indicates a state machine to apply to the received measured system parameter.

39. The article of manufacture of claim 38, wherein the state machine indicated in the status object comprises a default state machine, further comprising:

receiving user modifications to at least one of the states, state actions or transition conditions of the state machine indicated in the status object;

generating a modified state machine implementing the user modifications; and updating the status object to indicate the modified state machine to apply to the received measured system parameter.

40. An article of manufacture implementing code to derive state information concerning a monitored system component by:

providing a status object including information on a current state of the monitored system component, wherein there is a plurality of states associated with the monitored system component, wherein each state is capable of having a state action and at least one transition condition associated with a transition state;

receiving a measured system parameter;

determining whether the received measured system parameter satisfies one transition condition associated with the current state indicated in the status object; and if the received system parameter satisfies one transition condition, then performing the action associated with the transition state associated with the satisfied transition condition and setting the current state to the transition state in the status object, wherein each state is instantiated from at least one state class, wherein each status object is instantiated from a status object class.

41. An article of manufacture implementing code to monitor a system component by:

providing a state class and status object class;

instantiating a status object from the status object class, wherein the status object includes a current state variable indicating a current state of the state machine;

instantiating multiple states of the state machine from the state class, wherein each state is capable of having a state action and notification performed when transitioning to the state from another state;

generating at least one evaluation function for each state, wherein each evaluation function determines whether an operation on a measured system component satisfies a condition;

associating a transition state with each evaluation function; and updating the status object to indicate the transition state as the current state if the associated evaluation function determines that the condition is satisfied.

42. The article of manufacture of claim 41, wherein instantiating the current status object further comprises setting a state machine variable indicating one state machine including instantiated states, generated evaluation functions, and associated transition states, wherein the indicated state machine is used to determine the transition state based on the measured system parameter.

43. The article of manufacture of claim 42, further comprising:

setting an override state machine in the instantiated status object identifying a second state machine to use to determine the transition state based on the measured system parameter.

44. The article of manufacture of claim 41, wherein when instantiating the state, indicating at least one of a notification operation or system operation.

45. The article of manufacture of claim 41, wherein the state is capable of being a counter state having one counter evaluation function where the associated transition state is the state, wherein the counter state further includes a counter that is incremented when the counter evaluation function is satisfied.

46. The article of manufacture of claim 45, wherein generating the counter evaluation function further comprises generating an associated frequency event, wherein the state action associated with the counter state is performed if the associated frequency event was satisfied.

47. The article of manufacture of claim 46, wherein the frequency event indicates a time interval threshold, wherein determining satisfaction of the frequency event comprises determining whether a time since a last notification exceeds the time interval threshold.

48. The article of manufacture of claim 46, wherein the frequency event indicates a threshold value, wherein determining satisfaction of the frequency event comprises determining whether the counter exceeds the threshold value.

49. A computer readable medium including data structures for deriving state information concerning a monitored system component, comprising:

a status object including information on a current state of the monitored system component;

a plurality of states associated with the monitored system component, wherein each state object is capable of having a state action and at least one transition condition associated with a transition state, wherein a determination is made as to whether a received system parameter satisfies one transition condition associated with the current state indicated in the status object, and if the received system parameter satisfies one transition condition, then the action associated with the transition state associated with the satisfied transition condition is performed, and wherein the current state is set to the transition state in the status object; and a counter associated with at least one state, wherein the counter is incremented if the transition state associated with the satisfied transition condition is the current state.

50. The computer readable medium of claim 49, further comprising:

a frequency event associated with at least one transition condition, wherein, if the transition state is the current state, performing the state action associated with the current state if the frequency event associated with the transition condition is satisfied.

51. The computer readable medium of claim 50, further comprising a tune interval threshold associated with the transition condition, wherein determining satisfaction of the frequency event comprises determining whether a time since a last notification exceeds the time interval threshold.

52. The computer readable medium of claim 49, wherein each transition condition comprises a function on the measured system parameter determining whether a threshold is satisfied.

53. A computer readable medium including data structures for implementing a state machine to monitor a system component, comprising:

a state class;

a status object class;

a status object instantiated from the status object class, wherein the status object includes a current state variable indicating a current state of the state machine;

a plurality of states implementing a state machine instantiated from the state class, wherein each state is capable of having a state action and notification performed when transitioning to the state from another state;

at least one evaluation function for each state, wherein each evaluation function determines whether an operation on a measured system component satisfies a condition; and a transition state associated with each evaluation function, wherein the status object is updated to indicate the transition state as the current state if the associated evaluation function determines that the condition is satisfied.

54. The computer readable medium of claim 53, wherein instantiating the current status object further comprises setting a state machine variable indicating one state machine including instantiated states, generated evaluation functions, and associated transition states, wherein the indicated state machine is used to determine the transition state based on the measured system parameter.

55. The computer readable medium of claim 53, wherein the state is capable of being a counter state having one counter evaluation function where the associated transition state is the state, wherein the counter state further includes a counter that is incremented when the counter evaluation function is satisfied.

56. The computer readable medium of claim 55, further comprising a frequency event associated with the counter evaluation function, wherein the state action associated with the counter state is performed if the associated frequency event was satisfied.

57. The computer readable medium of claim 56, wherein the frequency event indicates a time interval threshold, wherein determining satisfaction of the frequency event comprises determining whether a time since a last notification exceeds the time interval threshold.

* * * * *